United States Patent
Droulez et al.

(10) Patent No.: US 7,413,243 B2
(45) Date of Patent: Aug. 19, 2008

(54) BEAM FOR REINFORCING A VEHICLE COCKPIT ORGANIZED TO RECEIVE A MODULE FOR THE SELECTIVE DISTRIBUTION OF AIR FROM A HEATING, VENTILATION AND/OR AIR CONDITIONING SYSTEM

(75) Inventors: Eric Droulez, Suresnes (FR); Serge Pouysegur, Le Perray en Yvelines (FR); Franck Truillet, Rueil Malmaison (FR)

(73) Assignee: Valeo Climatisation S.A., Saint Denis (FR)

( * ) Notice: Subject to any disclaimer, the term of this patent is extended or adjusted under 35 U.S.C. 154(b) by 193 days.

(21) Appl. No.: 11/175,496

(22) Filed: Jul. 6, 2005

(65) Prior Publication Data

US 2006/0199491 A1 Sep. 7, 2006

(30) Foreign Application Priority Data

Jul. 7, 2004 (FR) .................................. 04 07560

(51) Int. Cl.
*B60K 37/02* (2006.01)
(52) U.S. Cl. ................................. 296/193.02
(58) Field of Classification Search ............ 296/193.02, 296/193.01, 187.05, 187.03, 70
See application file for complete search history.

(56) References Cited

U.S. PATENT DOCUMENTS

| | | | |
|---|---|---|---|
| 5,934,744 A | 8/1999 | Jergenz et al. | |
| 6,315,347 B1 | 11/2001 | Gotz | |
| 6,644,722 B2* | 11/2003 | Cooper | 296/187.02 |
| 6,688,680 B1* | 2/2004 | Cooper et al. | 296/208 |
| 6,890,016 B2* | 5/2005 | Brancheriau | 296/70 |
| 6,912,863 B2* | 7/2005 | Tanaka et al. | 62/244 |
| 6,921,127 B2* | 7/2005 | Feith et al. | 296/193.02 |
| 7,128,360 B2* | 10/2006 | Scheib et al. | 296/70 |
| 2003/0122404 A1* | 7/2003 | Duchez | 296/208 |
| 2003/0193207 A1* | 10/2003 | Ito et al. | 296/72 |
| 2004/0056503 A1* | 3/2004 | Brancheriau | 296/70 |
| 2004/0108744 A1* | 6/2004 | Scheib et al. | 296/70 |
| 2004/0135400 A1* | 7/2004 | Matsuzaki et al. | 296/193.02 |
| 2006/0108824 A1* | 5/2006 | Yamazaki et al. | 296/70 |
| 2007/0024090 A1* | 2/2007 | Vander et al. | 296/193.01 |

FOREIGN PATENT DOCUMENTS

| | | |
|---|---|---|
| DE | 42 32 847 A | 3/1994 |
| FR | 2 813 824 A | 3/2002 |

* cited by examiner

*Primary Examiner*—Hilary Gutman
(74) *Attorney, Agent, or Firm*—Howard & Howard Attorneys, P.C.

(57) ABSTRACT

The subject of the invention is a hollow reinforcing beam (1) for the cockpit of a vehicle. This beam (1) constitutes a member through which air originating from a heating, ventilation and/or air conditioning system flows, and for this purpose comprises at least one air intake opening (21) and a plurality of outlet openings (23, 24, 26, 27, 29) for discharging the admitted air. This beam (1) is made up of an integral body stretching longitudinally in a constant direction which at its ends comprises windows (8, 9) for the longitudinal introduction of members for the selective distribution of the air admitted into the beam (1), and which is equipped at its ends with tips (12, 13) for reinforcing the beam (1) and fixing it to the cockpit of the vehicle.

20 Claims, 2 Drawing Sheets

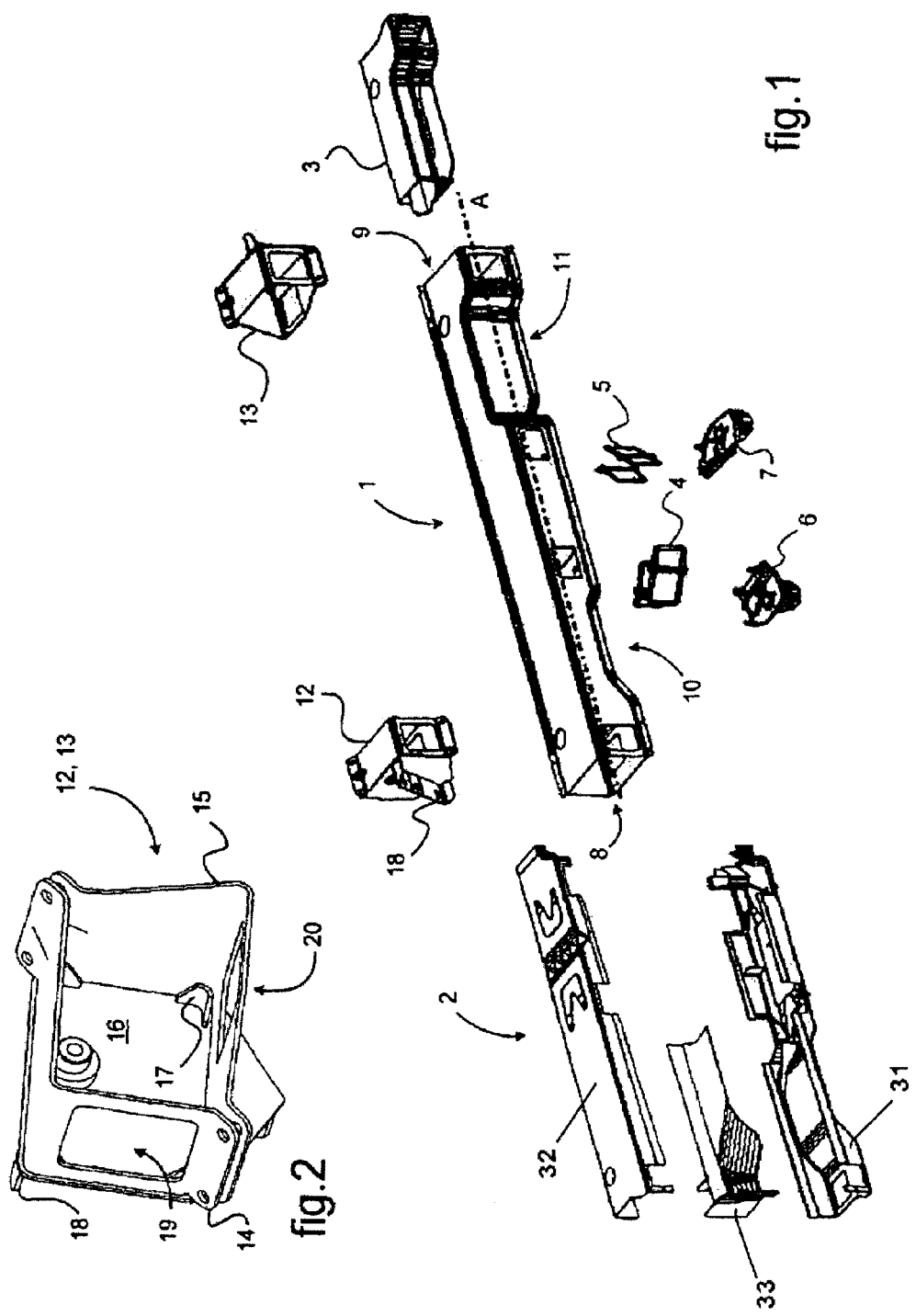

BEAM FOR REINFORCING A VEHICLE COCKPIT ORGANIZED TO RECEIVE A MODULE FOR THE SELECTIVE DISTRIBUTION OF AIR FROM A HEATING, VENTILATION AND/OR AIR CONDITIONING SYSTEM

TECHNICAL FIELD OF THE INVENTION

The invention falls within the field of heating, ventilation and/or air conditioning systems for vehicle cockpits in particular. Its subject is a beam for reinforcing the cockpit of a vehicle, organized to allow the circulation and selective distribution of air originating from such a system.

STATE OF THE ART

Heating, ventilation and/or air conditioning systems for vehicle cockpits which use the presence of a cockpit reinforcing beam to convey the air distributed by the system are known. These beams are organized in such a way either as to house ducts originating from the system or in such a way that they themselves constitute air distribution ducts. For example, reference may be made to documents WO0168391 (MAGNA INTERIOR SYS INC), WO09849024 (VOLVO PERSONVAGNAR AB), EP0989004 (DELPHI TECH INC), DE4239171 (DAIMLER BENZ AG) and FR2799413 (VALEO CLIMATISATION).

The problem posed lies in the overall organization of the beam whose mechanical strength, which is its primary function, must not be adversely affected by its being arranged as a member for the circulation and distribution of air. It is generally evident that this compromise which has to be found tends to reduce the structural performance of the beam because of the presence of apertures which constitute mechanical weaknesses, because of the required use, to too great an extent, of materials that are not very strong, especially plastics, or alternatively because of discontinuous modes of assembly between the constituent elements of the beam, which create structural weaknesses.

Furthermore, such beams are arranged in such a way as to collaborate with, or even to house, ancillary selective air distribution members, such as splitters or the like, and this tends to further increase the complexity of their organization in order to allow these ancillary members to be mounted.

It is evident from this that the overall difficulty to be overcome lies in finding a compromise between the structural simplicity of the beam, the structure of which has preferably intrinsically to offer the desired mechanical properties for reinforcing the cockpit, organizing the beam as a member capable selectively of conveying air streams from a heating, ventilation and/or air conditioning system, and the ease with which the beam offers ease of mounting of various members for splitting and distributing the admitted air.

SUBJECT OF THE INVENTION

The object of the present invention is to propose a beam for reinforcing a cockpit of a vehicle that constitutes a member selectively conveying air originating from a heating, ventilation and/or air conditioning system which satisfies the above-mentioned compromise.

The present invention in its entirety proposes to organize the beam as a hollow integral element stretching longitudinally in a constant direction comprising, at its ends, windows which offer a passage for the longitudinal introduction of members for the selective distribution of the air admitted into the beam. These windows are formed at the ends of the beam in order to orientate such an introduction passage along the overall line along which the beam extends, which is constant between its ends. These measures are such that the beam, stretching transversely with respect to the cockpit of the vehicle in a direction that is constant overall, is of a structure that is simple and robust in itself and intrinsically offers the desired mechanical properties of strength while at the same time allowing ease of mounting via its ends of selective air distribution members. The body is preferably equipped at its ends with tips for reinforcing the beam and fixing it to the cockpit of the vehicle.

The description of the body as an integral structure is to be understood as meaning a structure in which the body constitutes a robust element of normally closed cross section, this integral body being able to be made up of shells assembled to one another rigidly or even, and preferably, irreversibly by securing in order to give it appropriate robustness, particularly by welding or the like.

This integral body is preferably made up of at least two longitudinal elements secured to one another, particularly by welding or the like. In order to give this body appropriate robustness it is particularly proposed for these elements to be secured along at least 80% of their area of contact with one another.

The invention particularly aims to allow the longitudinal introduction into the beam of a selective air distribution module subdivided into compartmentalized respectively right and left longitudinal box structures. Such box structures may have an external cross section more or less corresponding to the internal cross section of the beam. It will be understood that such box structures in particular form various ducts for the circulation of air within the beam, being equipped with splitters or flaps for selectively directing the air admitted into the beam through at least one intake opening toward various corresponding outlet openings formed accordingly through the walls of the beam.

It will be noted that members for the selective distribution of air, splitters or the like in particular, can, for their part, be introduced into the beam through an overall air intake opening for air originating from the system, the dimensions of which are large enough to correspond to the combined dimensions of various outlet openings that the beam has, which are defined to offer satisfactory respective air flow rates according to the cockpit ventilation regions assigned to them.

By way of indication, such a beam, with a wall thickness of the order of 2 mm to 3.5 mm, has a first natural frequency of a minimum of 130 Hz, with high yield strength, both of which meet the requirements in this field. It will be noted that the material of which the beam is made may, with equal preference, be steel, aluminum or an alloy, a composite, or even a laminate.

Such properties of the beam offer the possibility of installing it in the vehicle by fixing it only by its ends, without any additional reinforcing piece of the stand leg type or any connection with the bulkhead.

Furthermore, the integral structure of the beam reinforced at its ends by the tips allows the various openings that the beam has to be sited with wide tolerances on the longitudinal and transverse position, and this means that the beam can easily suit any vehicle cockpit without the overall organization of its structure having to be modified.

More particularly, the beam of the present invention is a hollow reinforcing beam for the cockpit of a vehicle. This beam furthermore constitutes a member through which air originating from a heating, ventilation and/or air conditioning system flows, and for this purpose comprises at least one air intake opening and a plurality of outlet openings for discharging the admitted air.

According to the present invention, such a beam is chiefly recognizable in that it is made up of an integral body stretching longitudinally in a constant direction. This body at its ends comprises windows for the longitudinal introduction of members for the selective distribution of the air admitted into the beam. This body is furthermore equipped with tips for reinforcing the beam and fixing it to the cockpit of the vehicle.

It will be noted that the integral body is made up in particular of at least two longitudinal elements secured to one another, particularly by welding. This welding is, for example, laser welding, electron welding or capacitive discharge welding, or uses some other similar method.

The tips are preferably extended in the longitudinal direction of the beam to cover lateral air outlet openings, for structural reasons. These tips have apertures facing lateral air outlet openings of the beam. The tips may for example be organized as clamping collars. According to a preferred embodiment, these tips are each made up of a pair of brackets connected to one another at their free edges and preferably comprise a plate to close off the ends of the beam. This plate is advantageously provided with centering members for centering it at the end of the beam and with members for fixing the tips to a bearing structure of the cockpit.

The beam is, in particular, of polygonal cross section, especially of rectangular cross section. It will be noted that this cross section can vary along the length of the beam so as to form narrower regions for the passage of parts of the vehicle, such as a steering column and/or an airbag.

When the tips cover a region of the beam comprising an opening, these tips are provided with at least one window positioned facing this opening so as to allow air to pass.

DESCRIPTION OF THE FIGURES

The present invention will be better understood from reading the description which is about to be given of a preferred embodiment thereof, in conjunction with the figures of the attached plates, in which:

FIG. 1 is an exploded perspective illustration of a reinforcing beam of the present invention, surrounded by air distribution accessories that it is intended to house.

FIG. 2 is a perspective illustration of a tip that the beam depicted in FIG. 1 comprises.

In FIG. 1, a beam 1 for reinforcing a cockpit of a vehicle is organized for the circulation therethrough of air originating from a heating, ventilation and/or air conditioning system of the vehicle. More specifically, this beam 1 is arranged to house at least one box structure 2, 3 forming a selective air distribution module, or even splitters 4, 5 such as flaps or the like that it accommodates via connecting plates 6, 7. This beam 1 stretches longitudinally in a constant direction and is open at its ends to form windows 8, 9 through which the box structures 2, 3 are introduced so that they can be mounted inside the beam 1.

Figure 3:
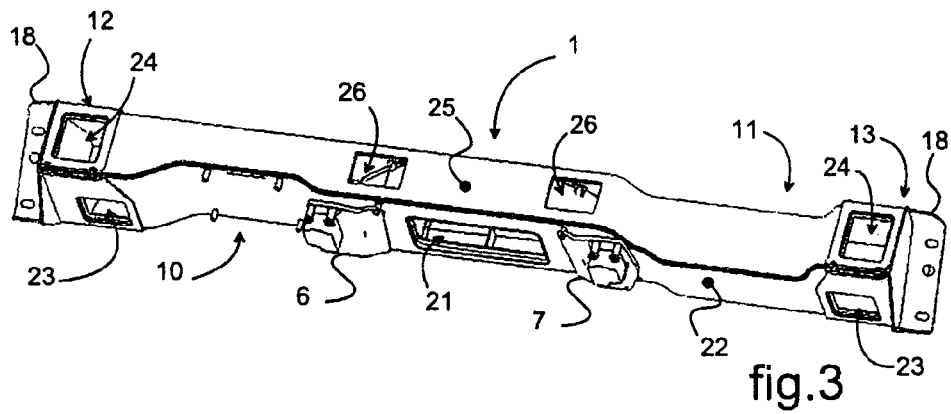
FIG. 3 is a perspective illustration of a beam depicted in FIG. 1, showing its front face and its underside.

It will be noted that the orientation of these windows 8, 9 with respect to the overall axis A along which the beam 1 extends is such that it allows the box structures 2, 3 to be passed through the windows 8, 9 along this axis A of extension of the beam 1. It will also be noted that introducing the box structures 2, 3 via the ends of the beam 1 is made possible in the case of box structures 2, 3 which have a significant longitudinal span, by virtue of the constancy of the span of the beam 1 between its ends. In the preferred exemplary embodiment illustrated, the cross section of the beam 1 is rectangular overall. It will be understood that the cross section of the beam 1 can vary, both in terms of shape and in terms of size without in any way inducing a variation in the overall direction in which it extends, particularly to form narrowed regions 10, 11 for the passage of a steering column of the vehicle or of an airbag.

Referring now to FIG. 2, the ends of the beam 1 are equipped with tips 12, 13 for reinforcement and for fixing the beam 1 to a bearing structure of the cockpit of the vehicle, particularly to members that the latter comprises. These tips 12, 13 are each shaped overall as a pair of brackets 14, 15 connected to one another by their free edges. A plate 16 that closes off the ends of the beam 1 is arranged at the end of the brackets 14, 15 of each of the tips 12, 13 and comprises centering members 17 for centering it on the exterior faces of the beam 1. A fixing flange 18 for fixing the tips 12, 13 to the bearing structure of the cockpit is formed at the rear face of this plate 16.

Since the brackets 14, 15 that make up the tips 12, 13 are likely to cover outlets 23, 24 that the beam 1 comprises, windows 19, 20 are formed in the tips 12, 13 so that they face these openings 23, 24 so as to allow air to pass out of the beam 1.

Figure 4:
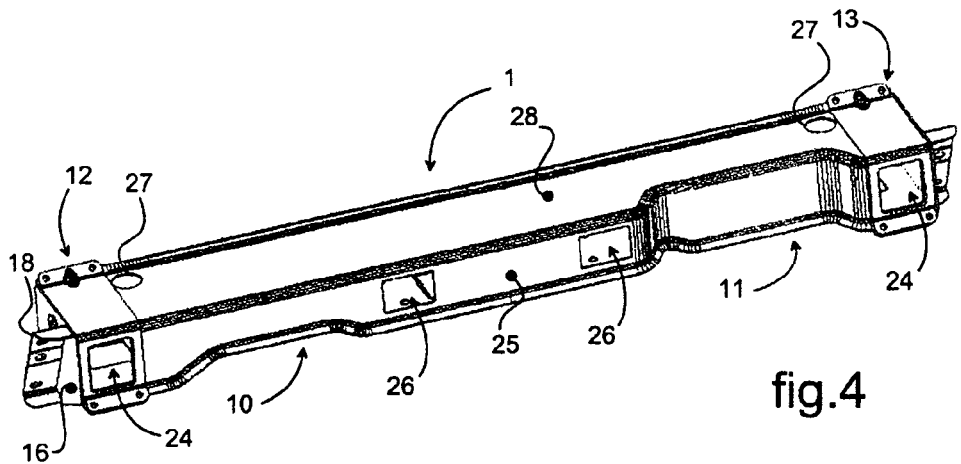
FIG. 4 is a perspective illustration of a beam depicted in FIG. 1, showing its front face and top surface.
Figure 5:
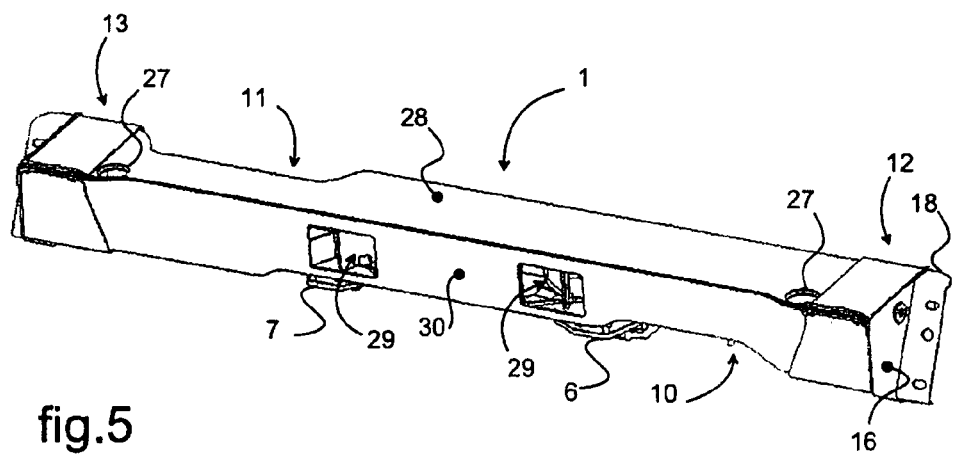
FIG. 5 is a perspective illustration of a beam depicted in FIG. 1, showing its rear face and top surface.

In FIG. 3 to FIG. 5 the beam 1 has various openings on its faces and surfaces. It will be noted that the architecture of the beam 1 proposed by the invention allows these openings to be positioned relatively freely along the faces and surfaces of the beam, so as to tailor this beam to any vehicle without in any way either considerably modifying its structure or affecting its desired intrinsic mechanical strength properties.

In FIG. 3, an air intake opening 21 is formed more or less in the central region of the underside 22 of the beam 1. This air intake opening 21 is, by way of indication, of a size that exhibits a surface area of between 1.2 dm$^2$ and 2.2 dm$^2$. It will be noted that such a surface area is to be estimated with regard to the current values in the field for air flow rates of the order of 500 kg/h to 700 kg/h. Such a size can be put to good use for introducing at least one splitter 4, 5 after the box structures 2, 3 that make up the air distribution module have been introduced in particular. It will be noted at this stage in the description that the surface area of the air outlet openings that the beam comprises, considered individually, is between 0.17 times and 0.15 times the surface area of the air intake opening 21.

Outlet openings 23 for the respective right and left rear ventilation are formed at the corresponding ends of the underside 22 of the beam 1.

Referring also to FIG. 4, outlet openings 24 for the right and left lateral ventilation respectively are formed at the corresponding ends of the front face 25 of the beam 1.

Outlet openings 26 for central ventilation are formed in the central region of the front face 25 of the beam 1.

Referring also to FIG. 5, outlet openings 27 for demisting a right and a left of the beam 1 respectively are formed at the corresponding ends of the top surface 28 of the beam 1. These openings 27 each have a surface area of between 0.05 and 0.2 times the combined surface area of the air outlet openings 27, 29 for deicing and/or gentle diffusion and for demisting.

Outlet openings 29 for deicing and/or gentle diffusion are formed in the central region of the rear face 30 of the beam 1. These openings 29 have a combined surface area of the order of between 0.8 and 0.95 times the combined surface area of the air outlet openings 27, 29 for deicing and/or gentle diffusion (29) and for demisting (27).

It will be noted that, according to a preferred embodiment and by way of indication, the beam 1 has an external cross section of the order of 1.81 dm$^2$ and a maximum internal cross section of the order of 1.64 dm$^2$, for a wall thickness of the order of 3 mm. When the beam 1 distributes air only for front ventilation, the minimum internal cross section thereof is of the order of 1 dm$^2$.

The combined surface area of the air outlet openings 23, 24, 26, 27, 29 is of the order of 6.3 dm$^2$ for, respectively, a distribution of these areas of the order of 0.962 dm$^2$ for the rear ventilation openings 23, of the order of 0.956 dm$^2$ for the side ventilation openings 24, of the order of 0.814 dm$^2$ for the central ventilation openings 26, of the order of 0.318 dm$^2$ for the demisting openings 27, and of the order of 1.438 dm$^2$ for the deicing and/or gentle diffusion openings 29.

Furthermore, the combined surface area of the openings formed in the faces and surfaces of the beam with respect to the overall surface area of these openings is of the order of 44% on the underside of the beam, of the order of 28% on the front face, of the order of 5% on the top surface and of the order of 23% on the rear face.

The internal cross section of the beam 1 at the narrower regions 10, 11 is, in particular, between 0.25 times and 0.7 times the surface area of the air intake opening. More specifically, if there is just one lateral ventilation opening 24, the cross section of the beam 1 at the narrower region 10, 11 is of the order of 0.25 times the surface area of the air intake opening 21, whereas if other outlet openings such as a rear ventilation opening 23 and a lateral demisting opening 27 are combined with this lateral ventilation opening 24, then this cross section of the beam 1 is of the order of 0.7 times the surface area of the air intake opening. It will be understood that these cross-sectional dimensions of the beam are given by way of indication and must, as appropriate, take account of the size required for an air distribution box structure or the like positioned inside the beam.

The sum of the surface areas of the outlet openings 27, 29 for demisting and deicing is between 0.7 dm$^2$ and 1.6 dm$^2$. It will be understood that these dimensions are to be taken into consideration with respect to a customary air flow rate in this field which is of the order of 320 kg/h to 500 kg/h.

In the exemplary embodiment illustrated, the selective air distribution module is made up of two box structures 2 and 3. A first box structure is itself made up of three elements 31, 32, 33, two of which are longitudinal elements 31 and 32, and one of which is an internal partitioning element 33. A second box structure 3 for its part is made of an integral element. The method of assembling the beam with the members for the selective distribution of air consists in particular in performing the following successive steps:

securing the constituent elements of the beam 1 to one another, particularly by welding, to form the integral body.

introducing the member or members 2, 3 for the selective distribution of air longitudinally into the beam 1, through the respective end windows 8, 9 formed therein.

fixing the members 2, 3 for the selective distribution of air to the beam 1, particularly by screwing. If appropriate, this operation is also used to assemble the constituent elements of the selective air distribution members with one another, these members being such as the elements 31, 32, 33 that make up the box structure 2.

introducing and fixing the splitter or splitters 4, 5 inside the beam through the intake opening 21. It will be noted that these splitters are likely to comprise splitters allocated and fixed to the box structures (not depicted) and splitters allocated to the air intake opening 21 and fixed directly to the beam 1, via connecting plates 6, 7 in particular.

More specifically in the exemplary embodiment illustrated, the method of assembling a beam of the present invention, with selective air distribution members such as illustrated, comprises the successive steps that consist in:

longitudinally introducing a first longitudinal element 31 of the box structure into the beam through its corresponding end. It will be noted that this element 31 is the one that, as appropriate, has a narrowed region for the passage of a part of the vehicle, particularly the steering column.

slipping the second longitudinal element 32 on the first element 31 so as to introduce it into the beam.

placing the partitioning element 33 at the end of the longitudinal elements 31 and 32.

fixing the longitudinal elements 31, 32 through orifices that the beam 1 has, from outside the beam 1, by screwing in particular or the like, so as to assemble these longitudinal elements 31, 32 with one another and secure them to the beam 1 while at the same time producing a seal between these various assembled elements 21, 32.

introducing and fixing the second box structure inside the beam, from its opposite end to the previous end.

as appropriate, introducing and fixing splitters inside at least one of the box structures, through the intake opening 21.

introducing central splitters 4, 5 into the beam 1, through the intake opening 21. It will be noted that these central splitters 4, 5 are advantageously fixed to the beam via connecting plates 6 and 7.

The invention claimed is:

1. A hollow reinforcing beam for a cockpit of a vehicle, the beam constituting a member through which air originating from at least one of a heating, ventilation and air conditioning system flows, and for this purpose comprising at least one air intake opening and a plurality of outlet openings for discharging the admitted air, and the beam is made up of an integral body stretching longitudinally in a constant direction and presents ends comprising windows for the longitudinal introduction of members for the selective distribution of the air admitted into the beam, and the beam is equipped at the ends with tips for reinforcing the beam and fixing the beam to the cockpit of the vehicle.

2. The beam as claimed in claim 1, wherein the integral body is made up of at least two longitudinal elements secured to one another.

3. The beam as claimed in claim 2, wherein the elements that make up the body contact each other along a contact area and are secured to one another along at least 80% of the contact area.

4. The beam as claimed in any one of claims 2 and 3, wherein the elements that make up the body are secured by welding.

5. A method of assembling a beam with members for the selective distribution of air as claimed in any one of claims 2 to 3, and which consists in performing the following successive steps:

securing the constituent elements of the beam to one another to form the integral body;

introducing the member or members for the selective distribution of air longitudinally into the beam, through the respective end windows formed therein;

fixing the members for the selective distribution of air to the beam, particularly by screwing;

introducing and fixing splitters inside the beam through the intake opening.

6. The beam as claimed in any one of claims 1 to 3, wherein the members for the selective distribution of air are introduced into the beam through an overall air intake opening for air originating from the system.

7. The beam as claimed in any one of claims 1 to 3, wherein the tips are organized as clamping collars.

8. The beam as claimed in claim 7, wherein the tips are each made up of a pair of brackets connected to one another at their free edges.

9. The beam as claimed in any one of claims 1 to 3, wherein, with the tips covering a region of the beam comprising an opening, these tips are provided with at least one window positioned facing this opening so as to allow air to pass.

10. The beam as claimed in claim 9, wherein the tips are each made up of a pair of brackets connected to one another at their free edges.

11. The beam as claimed in any one of claims 1 to 3, wherein the tips comprise a plate to close off the ends of the beam, this plate being provided with centering members for centering it on this beam and with members for fixing the tips to a bearing structure of the cockpit.

12. The beam as claimed in any one of claims 1 to 3, and which is of polygonal cross section.

13. The beam as claimed in any one of claims 1 to 3, and which is of a cross section that can vary along its length so as to form narrower regions for the passage of parts of the vehicle.

14. The beam as claimed in claim 13, wherein the internal cross section of the beam at the narrower regions is between 0.25 times and 0.7 times the surface area of the air intake opening.

15. The beam as claimed in any one of claims 1 to 3, wherein the air intake opening is of a size that exhibits a surface area of between 1.2 $dm^2$ and 2.2 $dm^2$.

16. The beam as claimed in any one of claims 1 to 3, wherein the air intake opening is formed in a central region of the underside of the beam.

17. The beam as claimed in any one of claims 1 to 3, wherein the surface area of the air outlet openings, considered individually, is between 0.17 times and 0.25 times the surface area of the air intake opening.

18. The beam as claimed in claim 17, wherein the sum of the surface areas of the outlet openings for demisting and deicing is between 0.7 $dm^2$ and 1.6 $dm^2$.

19. The beam as claimed in claim 18, wherein outlet openings for demisting the right and the left respectively are formed at the corresponding ends of the top surface of the beam and each have a surface area of between 0.05 and 0.2 times the combined surface area of the air outlet openings for at least one of deicing and gentle diffusion and for demisting.

20. The beam as claimed in claim 18, wherein outlet openings for deicing and/or gentle diffusion are formed in the central region of the rear face of the beam and have a surface area of between 0.8 and 0.95 times the combined surface area of the air outlet openings for at least one of deicing and gentle diffusion and for demisting.

* * * * *